Dec. 2, 1969  R. A. HATSCHEK  3,482,121
PIEZOELECTRIC TRANSDUCER
Filed Nov. 13, 1967
FIG. 1
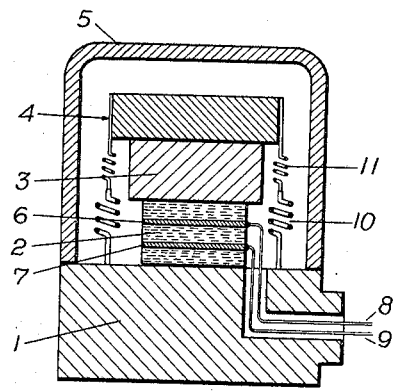
FIG. 2
FIG. 3
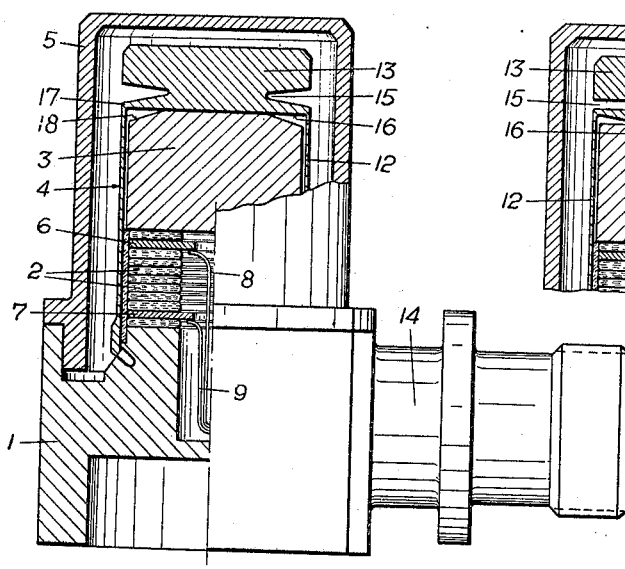
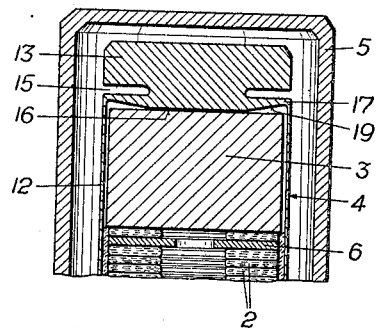
Inventor
Rudolf A. Hatschek
By Watson, Cole, Grindle & Watson
Attys.

United States Patent Office 3,482,121
Patented Dec. 2, 1969

3,482,121
PIEZOELECTRIC TRANSDUCER
Rudolf A. Hatschek, Fribourg, Switzerland, assignor to Vibro-Meter AG., Fribourg, Mancor, Switzerland
Filed Nov. 13, 1967, Ser. No. 682,048
Claims priority, application Austria, Nov. 16, 1966, A 10,575/66
Int. Cl. H02n 7/00
U.S. Cl. 310—8.4   7 Claims

ABSTRACT OF THE DISCLOSURE

A piezoelectric transducer, particularly for accelerometry, the piezoelectric element thereof is spring-loaded by a prestressing device and by an additional spring member having a limited pitch and being arranged in series in relation to the spring tension of the prestressing device.

Background of the invention

Pieoelectric transducers are known to consist of a piezoelectric element composed of piezoelectric members, generally quartz crystals or piezoelectric ceramics, with interposed electrodes and arranged inside a hermetically sealed housing. In order to prevent individual piezoelectric members from being lifted off each other and off adjoining elements and in order to be able to transmit tensile forces via the piezoelectric element, a prestressing device is provided which exerts a spring tension upon the piezoelectric element. This prestressing force should always be greater than the opposing lifting force or the tensile forces to be transmitted, liable to occur during the operation of the transducer. Moreover, contact pressure between superjacent members of the piezoelectric element must not be allowed to fall below a certain limit.

The prestressing device usually consists of a prestressing sleeve comprising a thin shell which is elastic in an axial direction and surrounding the piezoelectric element, the said shell being preferably welded together with the housing of the transducer, so as to provide simultaneously also a hermetic sealing for the piezoelectric element. In order to obtain a firm base, the thickness of the bottom portion of the prestressing sleeve is such as to preclude its sagging due to the action of the prestressing forces. For the purpose of measuring acceleration, another solid intermediate part is furthermore arranged inside the prestressing sleeve between the bottom of same and the piezoelectric element, the said intermediate part forming in conjunction with the solid bottom portion the seismic mass. The housing of the piezoelectric accelerometer is connected with the body to be tested in such a manner that only the acceleration component falling in the desired direction and acting upon the seismic mass is actually measured.

Piezoelectric transducers are frequently used for example, for measuring the pressure and pressure distribution in the cylinders of internal combustion engines and compressors, for accelerometry, for the monitoring of engines and power plants etc. In recent times, continuous monitoring of aircraft power plants by means of piezoelectric accelerometers has been gaining importance. The accelerometers are mounted in suitable locations of the power plants and serve to monitor operational vibrations of the compressor and turbine shafts. In the process, they are subject to relatively high temperatures of the order of 400° C. and over, particularly so in power plants of recent design, having an intermediate shell, as a result of which the prestressing device is subject to a corresponding thermal expansion and its temperature often differs considerably from that of the appropriately protected piezoelectric element, particularly so with fluctuating temperatures. The proportions assumed by this thermal expansion may be such as to reduce the prestress existing under normal temperature conditions unduly and even to cancel the same out completely. It is in many cases impossible to overcome this difficulty by a corresponding increase of the prestress, because the elastic members of the prestressing devices, such as the elastic shell of a prestressing sleeve present a comparatively small cross-sectional area so that any major increase of prestress would expose the material to a stress in excess of its yield strength. In addition, the piezoelements would thus be exposed to excessive pressure at normal temperatures.

Summary of the invention

It is the object of the invention to eliminate these difficulties by providing a piezoelectric transducer comprising a prestressing device capable of assuring adequate prestress for the piezoelectric element over a major temperature range without placing undue stress on the materials used.

The invention consists in a piezoelectric transducer, comprising a piezoelectric element spring-loaded by means of a prestressing device, an additional spring member having a limited pitch and acting on the piezoelectric element being arranged in series in relation to the spring tension of the prestressing device, the said additional spring member being less rigid than the spring tension of the prestressing device. The spring tension of the additional spring member preferably equals the admissible minimum prestressing force of the piezoelectric element. According to the invention the prestressing device, as usual, may consist of a material which is particularly suitable for that purpose and present a minor cross-sectional area in its elastic portion. If the prestressing device is subject to thermal expansion, the spring member arranged in series in relation thereto ensures the required minimum prestress under all circumstances, so that even with major temperature fluctuations the correct functioning of the transducer is assured.

The arrangement according to the invention is particularly suitable for a transducer whose prestressing device consists of a prestressing sleeve with a shell which is elastic in the direction of its axis and having a solidly built bottom portion, the piezoelectric element being arranged inside the prestressing sleeve. In order to provide the additional spring member the bottom portion of the prestressing sleeve being flexible in its periphery adjoining the shell of the sleeve, and being solid in its central portion transmitting the prestressing force to the piezoelectric element. The firm support resulting in a rigid transfer of force between the bottom portion of the prestressing sleeve and the piezoelectric element is particularly essential for the measurement of accelerations, since for example, the arrangement of the additional, softer spring member between the solid portion of the bottom of the prestressing sleeve and the piezoelectric element, the bottom portion together with an intermediate piece possibly inserted between the bottom portion and the piezoelectric element forming the seismic mass, would produce a vibrational system with two degrees of freedom which would not be suitable for purposes of accelerometry.

The bottom portion of the prestressing sleeve may be provided with a circumferentially extending radial recess in its periphery adjoining the sleeve shell thereby presenting the shape of a cup spring. The radial depth of the radial recess amounts preferably to one-quarter of the diameter of the prestressing sleeve. Thus an adequate spring action can be obtained and furthermore, a sufficient cross-sectional area is preserved to ensure a rigid transfer of force from the bottom of the prestressing sleeve to the piezoelectric element.

The inner surface of the bottom of the prestressing sleeve can be conically recessed, for example by turning, in the area adjoining the shell of the sleeve. Furthermore, inset means may be provided inside the prestressing sleeve resting on the bottom of same, such as for example, an intermediate piece serving for the transfer of the prestressing force to the piezoelectric elements, which inset means being tapered at its extremity resting on the bottom of the sleeve. Both of these measures are intended to offer the spring-cup-shaped portion of the bottom portion of the prestressing sleeve freedom of movement within certain limits. If the maximum prestressing force is applied, the elastic bottom portion rests positively on the piezoelectric element or on the intermediate piece, if any, also in its circumference adjoining the shell of the sleeve, so that the entire spring tension of the prestressing sleeve is transmitted to the piezoelement. When the temperature rises and consequently, the shell of the sleeve expands, the elastic portion of the bottom of the sleeve disengages itself from its supporting surface so that its spring action will exert itself to its full extent and ensure an adequate amount of prestress.

Brief description of the drawing

Further optional details and advantages of the invention will become apparent from the following description of several embodiments of the invention with reference to the accompanying drawing in which:

FIG. 1 is a schematic longitudinal sectional view of an accelerometer according to the invention, and FIGS. 2 and 3 each show a longitudinal view of further embodiments of the invention.

Description of the preferred embodiments

The embodiments of the invention shown in the drawings refer to accelerometers. These comprise a housing 1, a piezoelectric element 2 mounted thereon, an intermediate or inset piece 3 and a prestressing device 4 surrounding the piezoelectric element 2 and the intermediate piece 3. A covering hood 5 is provided for the protection of the prestressing device 4 against mechanical damage. The piezoelectric element 2 comprises electrodes 6 and 7 from which connections 8 and 9 extend outwardly through the housing 1. The prestressing device 4 impinges upon the piezoelectric element 2 via the intermediate piece 3 with a spring tension, thereby preventing the intermediate piece 3 from lifting itself off the piezoelectric element and making it possible also for tensile forces to be transmitted via the piezoelectric element. In addition, the prestressing device 4 serves for the maintenance of the surface pressure between the individual component parts of the piezoelectric element 2 as required for the proper functioning.

FIG. 1 schematically illustrates the spring 10 formed by the prestressing device designated by reference number 4. In order to preclude an undue decrease of the prestressing force due to the thermal expansion of the prestressing device 4 as the accelerometer temperature rises, another spring element 11 is provided in series with spring 10, the said spring element 11 being less rigid than the spring 10. Under normal temperature conditions, the spring element 11 whose pitch is limited, e.g. by means of stops, occupies its wholly elongated or compressed end position. However, as soon as the temperature rises and thermal expansion of the prestressing device 4 which is heated more rapidly than the protected piezoelectric element 2 and the intermediate piece 3, occurs, resulting in a rapid decrease of the prestressing force of spring 10, the spring element 11 becomes effective in order to maintain the admissible minimum prestressing force of the piezoelectric element 2 under all circumstances.

In the embodiments of the invention illustrated in FIGS. 2 and 3, the prestressing device 4 comprises a prestressing sleeve with an axially flexible shell 12 and a solid bottom portion 13. With the lower portion of the shell 12 the prestressing sleeve is tightly attached to the housing 1, such as by welding, so that the prestressing sleeve also serves to seal the piezoelectric element 2 hermetically. The connections 8 and 9 emerge hermetically from a passage 14. In order to obtain an additional spring tension in serial relation to the prestressing force of the prestressing device 4, this design provides for a bottom portion 13 of the prestressing sleeve which is flexible along its periphery adjoining the sleeve shell 12. For that purpose, a circumferentially extending radial recess 15 is provided in a slightly spaced relation to and above the inner surface 16 of the bottom portion 13, the said recess defining a plate-shaped spring element 17. The recess 15 extends only over approximately one quarter of the diameter of the bottom portion 13, so that an adequate area of the bottom portion 13 remains for the rigid transmission of the prestressing force to the piezoelectric element 2. To ensure free mobility of the plate-shaped spring 17 within certain limits, the intermediate piece 3 presents a conical chamfer 18 on its extremity resting on the surface 16 as shown in FIG. 2. As illustrated in FIG. 3, the surface 16 is conically recessed for the same purpose, while the end of the intermediate piece 3 may be flat.

In the manufacture of the accelerometers shown in FIGS. 2 and 3, the prestressing device 4 is prestressed at ambient temperature in such a manner that the inner surface 16 of the bottom portion 13 will rest positively on the intermediate piece 3 also in the area of the flared portions 18 and 19, thereby prestressing the cup or plate-shaped spring 17 to the utmost. When the sleeve shell 12 is subject to major thermal expansion, the cup spring 17 will lift itself off its bearing surfaces and thus become effective. The tension of the cup spring 17 is such that it will maintain the admissible minimum prestressing force of the piezoelectric element 2 under all circumstances.

For example, the material generally used for the prestressing sleeve may be subject to a maximum permanent stress of approxiamtely 40 kg./mm.². Since the quality of the accelerometer depends in addition to the material used to make the sleeve, to a considerable extent also upon the ratio between the cross-sections of the piezoelectric element and of the shell of the prestressing sleeve, with the largest possible portion of the external measuring force flowing preferably via the piezoelectric element, the cross-sectional area of the sleeve should be as small as possible. In actual practice and for the embodiments of the invention shown it is approximately 5.3 square millimeters. Consequently, the admissible maximum prestressing force is about 210 kgs., whereas the minimum prestressing force as resulting from the required surface pressure between the component parts of the piezoelectric element is approximately 100 kgs. Without the provision of an additional spring member arranged in series in relation to the prestressing sleeve, thermal expansion due to increased temperature would therefore, be admissible only until such time when the minimum prestressing force of 100 kgs. has been attained. This would occur already with a temperature rise of approximately 100° C. By the provision of the additional spring member whose spring tension may be slightly over 100 kgs., the temperature range of the accelerometer is, however, considerably increased. For example, the additional spring member maintains an adequate prestressing force also with a temperature difference of 400° C. and more between the prestressing sleeve and the piezoelectric element.

The method hereabove described for positively maintaining the required minimum prestressing force is not only applicable in connection with piezoelectric transducers comprising prestressing sleeves but with the same effect also with transducers comprising other types of prestressing devices, such as for example, with a piezoelectric element prestressed by means of a central bolt extending through the piezoelectric body. Moreover, the additional spring member may be provided not only in connection with accelerometers but also with piezoelectric pressure transducers for pressure measurements or with piezoelectric load analyzers for the purpose of adequately increasing the temperature range of these instruments. It is, however, important under all circumstances, that the additional spring member should be arranged in series in relation to the spring tension of the prestressing device and that the entire prestressing circuit formed by the prestressing device and the piezoelectric element should present a single degree of freedom only, so as to preclude erroneous measurements.

What is claimed is:

1. A piezoelectric transducer, comprising a piezoelectric element spring loaded by means of a prestressing device, an additional spring member having a limited pitch and acting on the piezoelectric element being arranged in series in relation to the spring tension of the prestressing device, the said additional spring member being less rigid than the spring tension of the prestressing device.

2. A transducer as claimed in claim 1, wherein the spring tension of the additional spring member equals the admissible minimum prestressing force of the piezoelectric element.

3. A transducer as claimed in claim 1, the prestressing device comprising a prestressing sleeve having an axially elastic shell closed at one of its extremities by a bottom portion and surrounding the piezoelectric element arranged inside the prestressing sleeve, the bottom portion being flexible in its periphery adjoining the sleeve shell as to provide the said additional spring member, and being solid in its central portion transmitting the prestressing force to the piezoelectric element.

4. A transducer as claimed in claim 3, the bottom portion of the prestressing sleeve having a circumferentially extending radial recess in its periphery adjoining the sleeve shell thereby presenting the shape of a cup spring.

5. A transducer as claimed in claim 4, wherein the radial depth of the radial recess amounts to approximately one quarter of the diameter of the prestressing sleeve.

6. A transducer as claimed in claim 3, wherein inset means are provided supported on the bottom portion of the prestressing sleeve and transmitting the prestressing force to the piezoelectric element, which inset means being tapered at its extremity resting on the said bottom portion.

7. A transducer, as claimed in claim 2, wherein the surface of the bottom portion facing the interior of the prestressing sleeve is tapered in the area adjoining the sleeve shell.

References Cited

UNITED STATES PATENTS

| | | | |
|---|---|---|---|
| 2,411,401 | 11/1946 | Welch | 310—8.4 |
| 3,349,259 | 10/1967 | Kistler | 310—8.4 |
| 3,397,329 | 8/1968 | Riedel | 310—9.1 |
| 3,400,284 | 9/1968 | Elazar | 310—8.4 |
| 3,429,031 | 2/1969 | Kistler | 310—8.4 |

J. D. MILLER, Primary Examiner

U.S. Cl. X.R.

29—595; 310—8.7, 8.9, 9.1